(No Model.)

F. THONE.
ELECTRIC CURRENT REGULATOR.

No. 413,984. Patented Oct. 29, 1889.

Witnesses:
James F. Duhamel
Horace A. Dodge

Inventor:
Frank Thone,
by Dodger Sons,
his Attys.

UNITED STATES PATENT OFFICE.

FRANK THONE, OF DAVENPORT, IOWA.

ELECTRIC-CURRENT REGULATOR.

SPECIFICATION forming part of Letters Patent No. 413,984, dated October 29, 1889.

Application filed March 22, 1889. Serial No. 304,254. (No model.)

*To all whom it may concern:*

Be it known that I, FRANK THONE, a citizen of the United States, residing at Davenport, in the county of Scott and State of Iowa, have invented certain new and useful Improvements in Current-Regulators, of which the following is a specification.

My invention relates to automatic governors designed for dynamo-electric machines and motors, and has for its object to obtain in the case of motors a constant speed under varying loads, and when applied to dynamo-machines to obtain a constant current.

Figure 1:
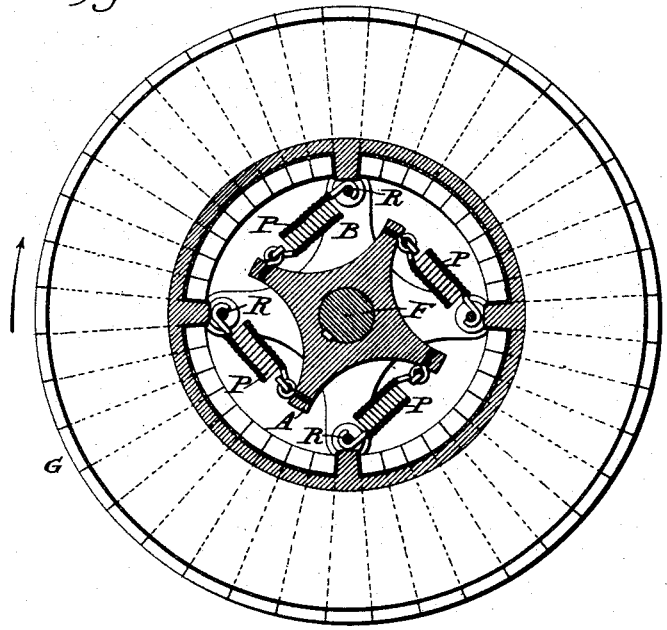
Figure 2:
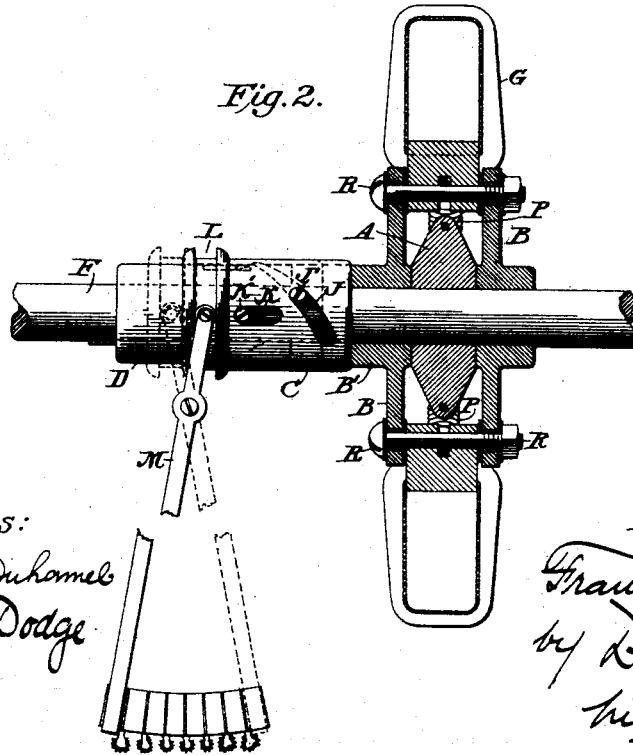

In the accompanying drawings, Figure 1 is a sectional view at right angles to the shaft, and Fig. 2 a longitudinal sectional view of the same.

F indicates the shaft of the machine, which will be supported in suitable bearings, (not shown,) and A indicates a spider secured rigidly to the shaft by means of a key and set-screw, or in any equivalent manner.

B B indicate spiders, which are mounted loosely upon the shaft on each side of the spider A, the arms of the spiders B B carrying or being secured to the armature proper G by means of bolts R, as shown in both figures. When the machine is at rest, the arms of the spider A occupy a position between the arms of the spiders B, as shown in Fig. 1.

P P indicate coiled springs secured at one end to the arms of the spider A and at the opposite end to the bolts R, connecting the armature proper with the arms of the spiders B. One of the spiders B is provided with a hub or collar B', which encircles the shaft F for a short distance, and which is in turn encircled or surrounded by a collar C, (shown in Fig. 2,) said collar or sleeve being provided with a circumferential groove L to receive the end of pivoted lever M, the free ends of which may connect with a commutator-brush carrier, a switch, or other regulating device, as hereinafter explained.

The sleeve C is provided with an inclined groove J, in which works a pin or stud J', secured to the sleeve or hub B' of the spider B, as shown in Fig. 2.

Secured rigidly to the shaft F is a second sleeve or collar D, which extends inside of the sleeve or collar C and abuts against the end of the hub B', as shown in dotted lines in Fig. 2, said sleeve D being provided with a stud or pin K', which works in a slot K, formed in the sleeve C in a direction parallel to the axis of the shaft.

If the machine be started with or without the load, the armature will attempt to go in the direction indicated by the arrow in Fig. 1. If there is no load, there will be very little pull on the springs, and the position of the parts will be nearly as indicated in the drawings; but if a load be put upon the pulley on one end of the shaft the shaft or pulley will tend to stop, and consequently the shaft will turn in the spiders B B and take a different position relatively thereto. As the spiders B B thus move they will, acting through the stud or pin J' and the inclined slots J, cause the sleeve C to be moved longitudinally of the shaft, as indicated by dotted lines in Fig. 2, said sleeve being caused to take this right-line movement by reason of the stud K' of the sleeve D (which is secured to the shaft) working in the straight slot K. Of course, as the sleeve C moves longitudinally upon the shaft or collar D it will carry with it the lever M, which will cause the latter to assume a different position.

In the drawings I have illustrated the invention as applied to the variation of resistance, but have adopted this merely as a convenient exemplification of the general idea.

The construction and arrangement of a commutator or of the resistance device will, of necessity, vary according to the character of the machine to which the invention is applied, and I do not wish to limit myself to any particular construction.

From the foregoing construction and arrangement it will be seen that the speed of the motor will be controlled by the load it is carrying and not by the speed itself, as would be the case if a centrifugal governor were used, and it will also be noticed that the device acts instantly and permits the motor to adjust itself to the load before the speed has time to change.

If the construction and arrangement hereinbefore described be applied to a dynamo-electric machine, the action will be the same, for in that case the shaft will be driven by power and the armature in return will adjust itself accordingly.

Having thus described my invention, what I claim is—

1. In combination with shaft F, spiders B B, mounted loosely thereon and carrying the armature G, a spider A, secured rigidly upon the shaft between the spiders B B, springs P, connecting the spider A and armature G, a regulator, and a sleeve or collar C, mounted upon the shaft and connected with a moving part of the regulator, all substantially as shown.

2. In combination with shaft F, provided with fixed spider A and loose spiders B B, armature G, secured to said spiders B B, springs P, connecting the spider A with the armature, a sleeve C, provided with slots J and K and with a groove L, a pin or stud J', secured to one of the spiders B and working in the slot J, a sleeve or collar D, secured rigidly to the shaft and provided with a pin or stud K' to work in the slot K, a regulator N, and a pivoted lever M, adapted to be actuated by the movement of the sleeve C, all substantially as shown.

In witness whereof I hereunto set my hand in the presence of two witnesses.

FRANK THONE.

Witnesses:
A. J. HIRSCHL,
JOHN HEINZ.